(12) United States Patent
Benkert et al.

(10) Patent No.: US 8,095,078 B2
(45) Date of Patent: Jan. 10, 2012

(54) COMMUNICATION TERMINAL DEVICE

(75) Inventors: Michael Benkert, Burgdorf-Hohenassel (DE); Andreas Schmidt, Braunschweig (DE)

(73) Assignee: Infineon Technologies AG, Neubiberg (DE)

( * ) Notice: Subject to any disclaimer, the term of this patent is extended or adjusted under 35 U.S.C. 154(b) by 1099 days.

(21) Appl. No.: 11/857,291

(22) Filed: Sep. 18, 2007

(65) Prior Publication Data

US 2008/0070504 A1   Mar. 20, 2008

Related U.S. Application Data

(60) Provisional application No. 60/825,975, filed on Sep. 18, 2006.

(51) Int. Cl.
*H04B 1/00* (2006.01)
*H04B 7/00* (2006.01)

(52) U.S. Cl. .............................. 455/69; 455/70; 455/41.2

(58) Field of Classification Search .................. 455/41.2, 455/41.1, 41.3, 423, 67.11, 67.14, 412.2, 455/62, 68, 69, 70, 115.1, 115.2
See application file for complete search history.

(56) References Cited

U.S. PATENT DOCUMENTS

| 6,785,227 | B1* | 8/2004 | Lu et al. ........................ 370/229 |
| 2005/0059389 | A1 | 3/2005 | Minko |
| 2005/0237956 | A1 | 10/2005 | Kuperschmidt et al. |

OTHER PUBLICATIONS

Bluetooth; Specification of the Bluetooth System: Master Table of Contents & Compliance Requirements; Covered Core Package version: 2.0 + EDR Current Master TOC issued Nov. 4, 2004.

* cited by examiner

*Primary Examiner* — Eugene Yun
(74) *Attorney, Agent, or Firm* — Dickstein Shapiro LLP

(57) ABSTRACT

In an embodiment of the invention, a communication terminal device, which may include a message generation circuit configured to generate an information inquiry message which specifies that another communication terminal device should transmit information about performance features of units in the physical layer or the data link layer of the other communication terminal device to that communication terminal device, a transmitting circuit configured to transmit the information inquiry message, a receiving circuit configured to receive an information message with the information from the other communication device terminal, and a selection circuit which is configured to use the information to select units in the physical layer or the data link layer of the communication terminal which should be used to set up a communication link to the other communication terminal device.

25 Claims, 6 Drawing Sheets

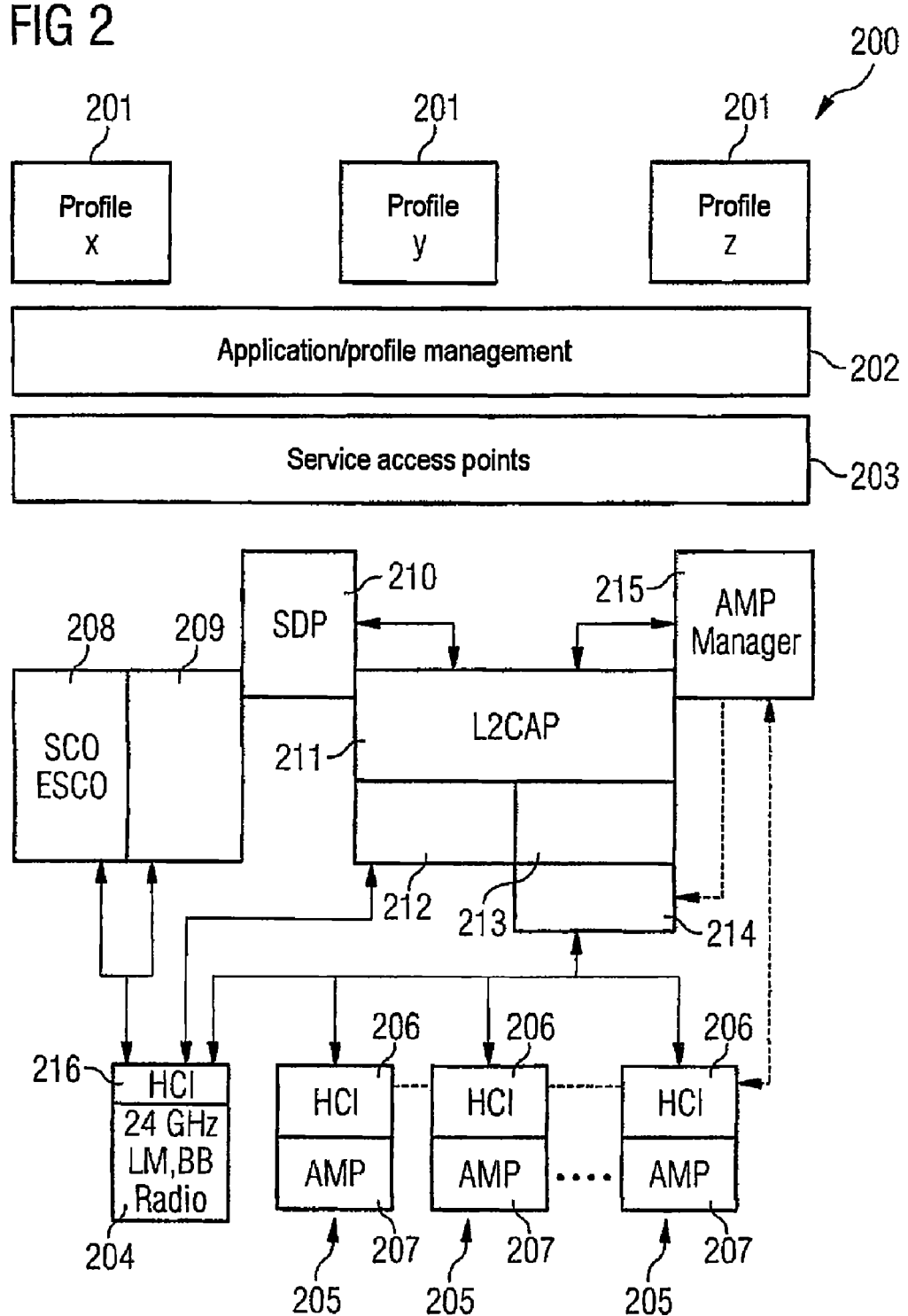

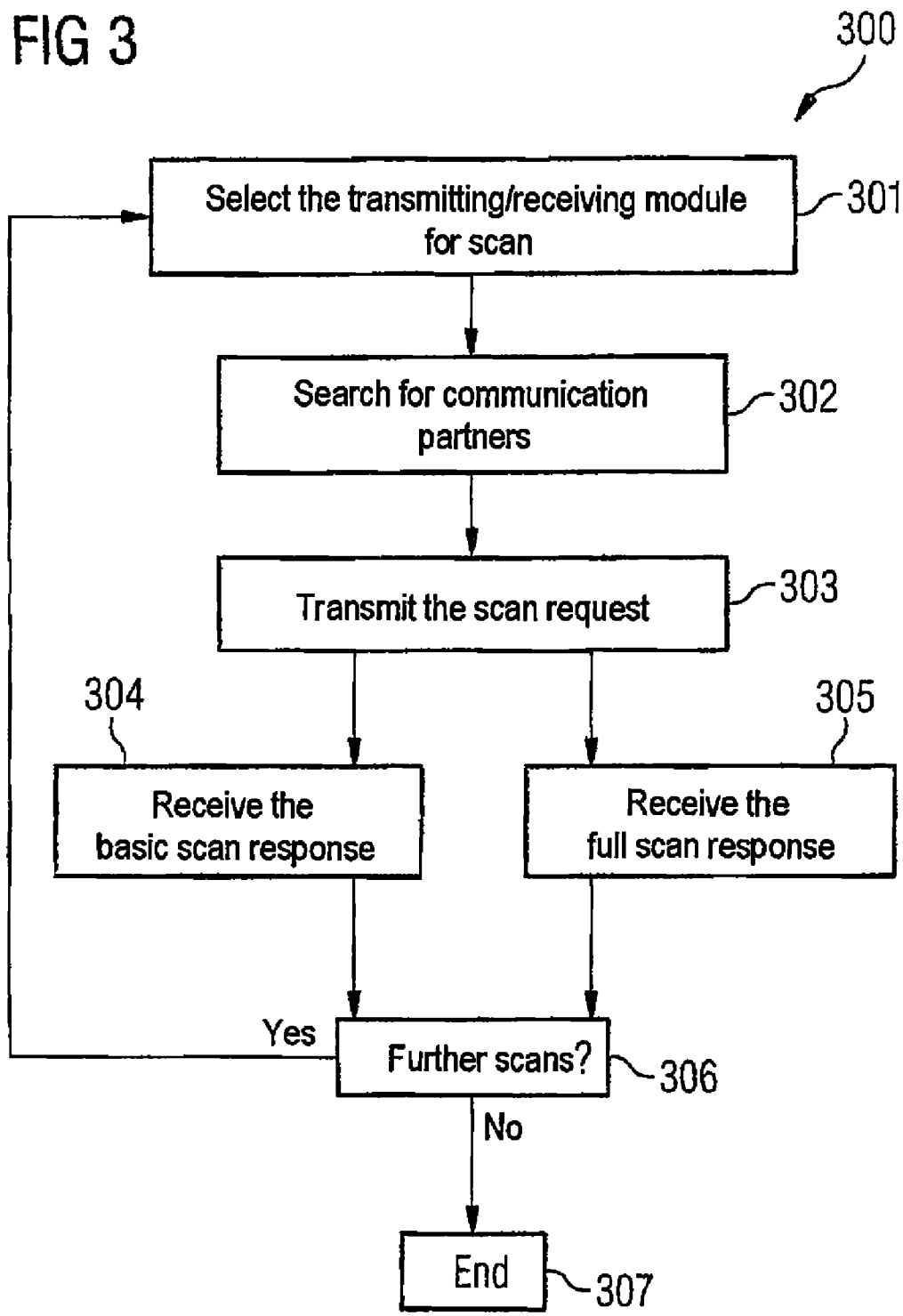

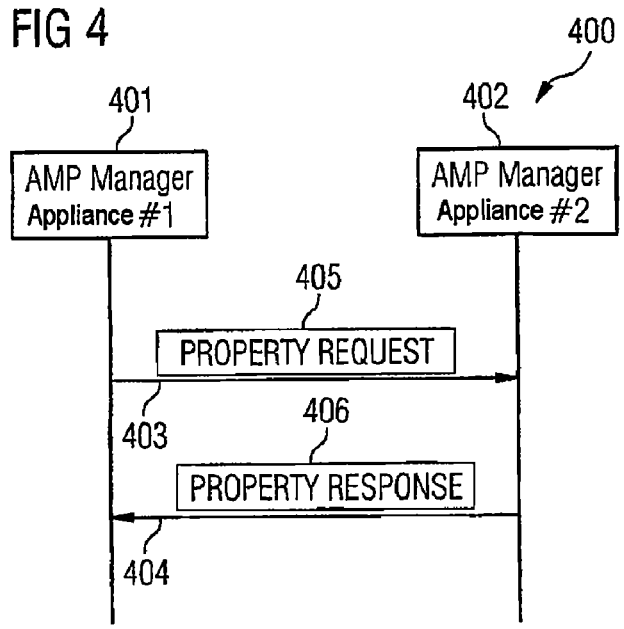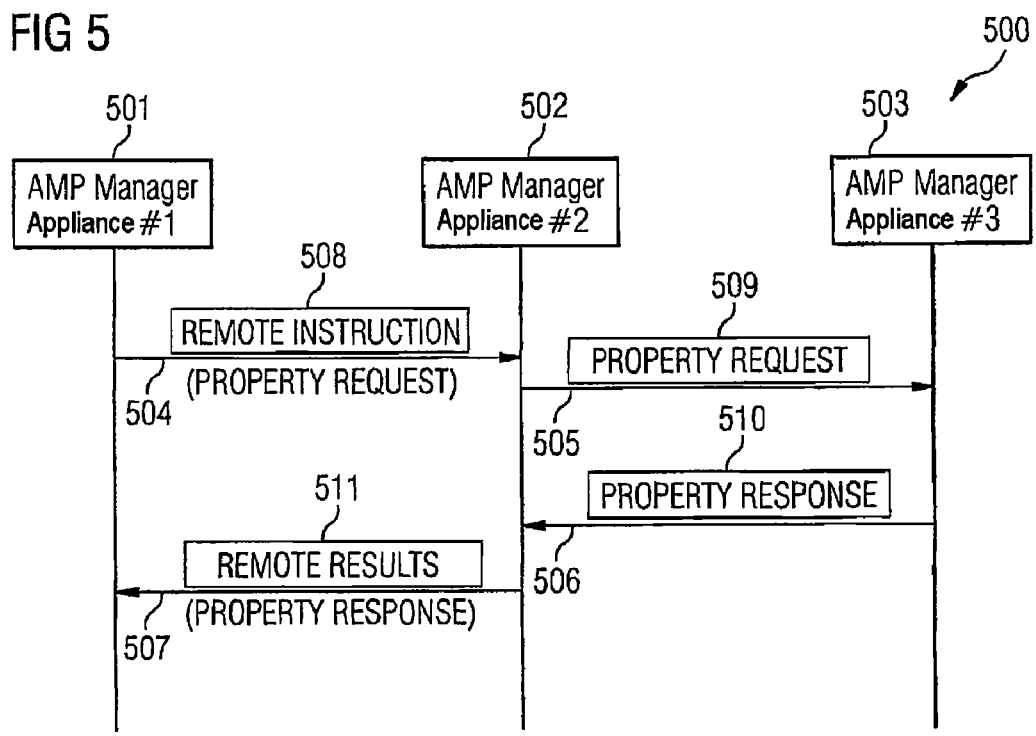

COMMUNICATION TERMINAL DEVICE

CROSS-REFERENCE TO RELATED APPLICATION

This application claims priority to Provisional Patent Application Ser. No. 60/825,975, which was filed Sep. 18, 2006, and is incorporated herein by reference in its entirety.

TECHNICAL FIELD

Embodiments of the invention relate generally to communication terminal devices, methods for requesting communication terminal device information and a method for production of communication terminal device information.

BACKGROUND

The "Core Specification Working Group" Standardization Group of the Bluetooth Special Interest Group (SIG) are currently discussing extension of the Bluetooth architecture to allow different communication technologies to be used. During this process, problems have occurred, for example, as a result of the different ranges of the various communication technologies, for example when setting up communication links.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 2 shows a Bluetooth architecture according to one exemplary embodiment of the invention;

FIG. 3 shows a flowchart according to one exemplary embodiment of the invention;

FIG. 4 shows a message flowchart according to one exemplary embodiment of the invention;

FIG. 5 shows a message flowchart according to one exemplary embodiment of the invention;

DESCRIPTION

Figure 1:
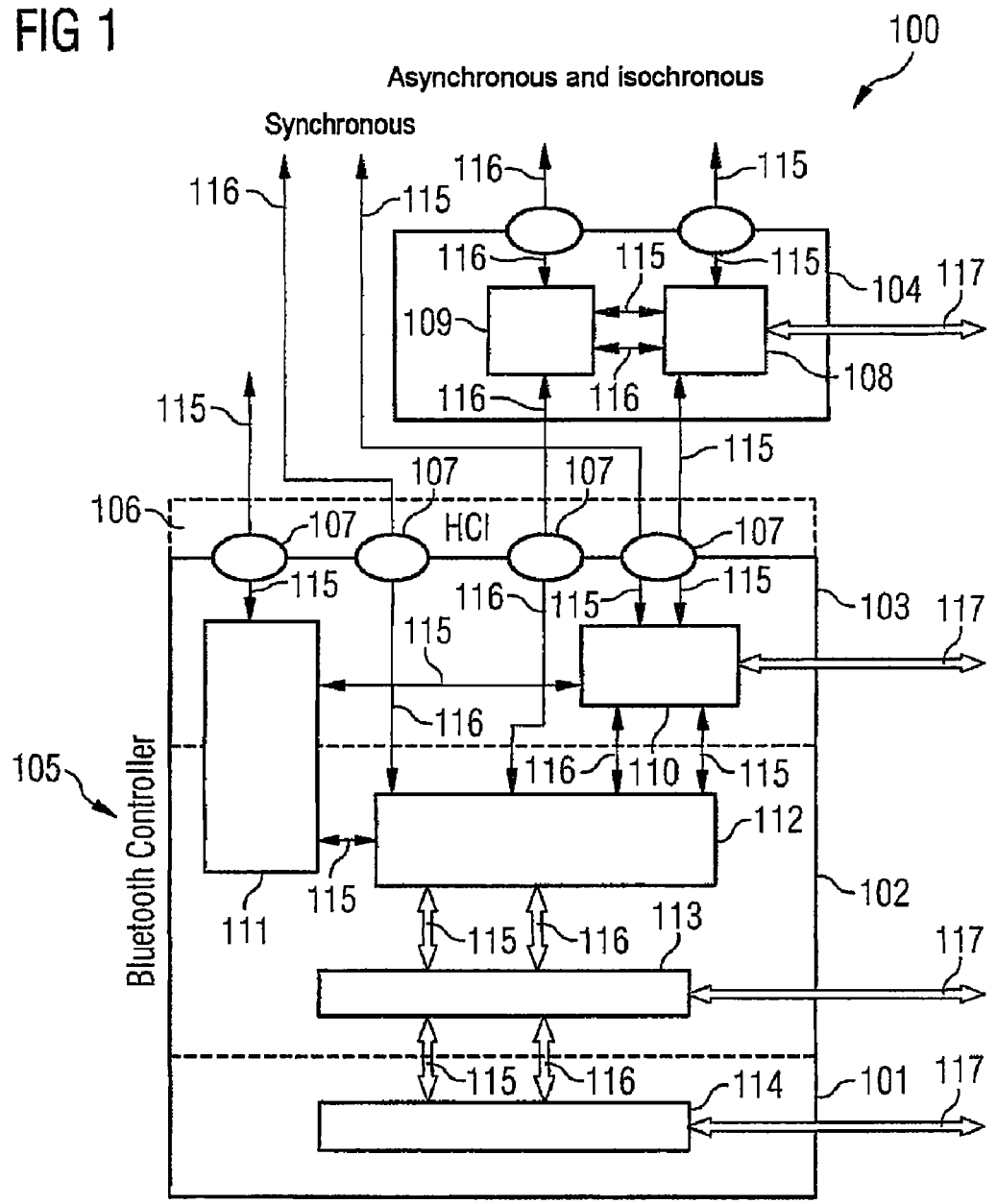
FIG. 1 shows a Bluetooth architecture.

Bluetooth technology is being used increasingly for local networking of small mobile communication terminal devices, such as mobile telephones and PDAs (Personal Digital Assistants) and for communication between computers and peripherals (for example a mouse or a keyboard). Bluetooth is an industry standard for wire-free networking of electronic appliances over a relatively short distance by radio.

Recently, Bluetooth technology is also increasingly being used in the automobile industry. For example, acoustic or optical input and output appliances or control elements (such as a microphone, a loudspeaker, displays or keys) which are permanently integrated in a car are being coupled to a mobile telephone without the use of wires, by means of Bluetooth. In order to make a telephone call, a car driver can use the input and output appliances or control elements in the car and need no longer directly operate the mobile telephone itself which, for example, can remain in a coat pocket while the car is being driven.

Bluetooth communication networks, that is to say communication networks based on the Bluetooth Standard, generally have an ad-hoc character, that is to say electronic appliances which are configured to use the Bluetooth technology and are brought within range of one another automatically and spontaneously find a Bluetooth communication network and automatically form a Bluetooth communication network. A Bluetooth communication network is also referred to as a WPAN (Wireless Personal Area Network). A Bluetooth appliance, that is to say a communication appliance which is configured to use Bluetooth technology, may simultaneously have up to seven communication links with other Bluetooth appliances. The available bandwidth is split between the communication links. A Bluetooth communication network, that is to say a communication network based on Bluetooth, is also referred to as a Bluetooth piconetwork.

Both speech data and other data items can be transmitted by means of a Bluetooth communication link, that is to say a communication link based on Bluetooth, between two Bluetooth appliances. Encryption of the transmitted data is also supported.

Communication appliances which are configured to use Bluetooth technology are equipped with a microchip, the so-called Bluetooth module, which provides the basic functionalities for operation of Bluetooth communication links. The Bluetooth module consumes little power, provides integrated security mechanisms and can be produced at relatively low cost. It can therefore be used in a wide range of electronic communication appliances.

A Bluetooth module has an RF (Radio-Frequency) section and a baseband control device. The baseband control device (baseband controller) forms the interface to the host system, that is to say to the electronic communication appliance in which the Bluetooth module is used, for example a PC, a laptop or a mobile telephone.

The Bluetooth Standard defines three transmission power classes: 1 mW (0 dBm), 2.5 mW (4 dBm) and 100 mW (20 dBm) which allow communication link ranges from 10 m to 100 m, as is illustrated in Table 1.

TABLE 1

| Bluetooth power classes | | |
|---|---|---|
| Class | Maximum transmission power | Minimum range for a visual link |
| 1 | 100 mW/20 dBm | 100 m |
| 2 | 2.5 mW/4 dBm | 20 m |
| 3 | 1 mW/0 dBm | 10 m |

Relatively little current is drawn by Bluetooth modules: in the standby mode, they draw about 0.3 mA, reaching a maximum of 140 mA in other modes. During reception, a Bluetooth module has a sensitivity of at least −70 dBm, and the channel bandwidth that is used is 1 MHz. Bluetooth appliances currently make use of the unlicensed ISM (Industrial, Scientific, Medical) frequency band for communication links. The ISM frequency band is between 2.402 GHz and 2.480 GHz and can be used without licensing throughout the world. Bluetooth communication links which are provided by means of the ISM frequency band may be subject to interference from WLAN (Wireless Local Area Network) communication networks, cordless (landline) telephones, garage-door openers and microwave cookers, since they likewise transmit electromagnetic waves using the ISM frequency band.

In the case of Bluetooth, robustness to interference is achieved by using a frequency hopping method, in which the ISM frequency band is subdivided into 79 frequency steps separated by 1 MHz, and hopping takes place between the frequency steps up to 1600 times per second during radio transmission. Guard bands are provided for adjacent frequency bands.

In the case of Version 1.2 Bluetooth (and the older versions), a data transmission rate of 723.2 kbit/s can in theory be achieved for downloading (that is to say net data transmission rate for downloading), with a simultaneous data transmission rate of 57.6 kbit/s for uploading (that is to say net data transmission rate for uploading). Bluetooth Version 2.0 provides an optional enhancement, which is known by the name EDR (Enhanced Data Rate) and allows a maximum data transmission rate that is approximately three times as high, that is to say about 2.2 Mbit/s (net data transmission rate for downloading).

The theoretical ranges of Bluetooth appliances depending on the power class, as shown in Table 1, can be increased with little effort, so that a mobile telephone which is configured to use Bluetooth technology and, for example, a Bluetooth communication link with a personal computer which is equipped with a modified Bluetooth USB (Universal Serial Bus) dongle with a directional radio antenna may have a range of 1.5 km, subject to line-of-sight contact.

When a Bluetooth appliance is started up, the Bluetooth controller that is provided in the Bluetooth module of the Bluetooth appliance identifies itself by transmitting an individual and unique sequential number, with a length of 48 bits, within 2 seconds. When a Bluetooth appliance is in the standby mode without any communication link with another Bluetooth appliance, then it checks every 1.28 seconds whether another Bluetooth appliance is transmitting messages (on 32 frequency steps). A Bluetooth appliance can initiate a communication link with another Bluetooth appliance, and thus becomes a master. The contact with other Bluetooth appliances from the master Bluetooth appliance (that is to say with the slaves) is in each case made by means of an inquiry message and a subsequent page message, if the hardware address of the respective other Bluetooth appliance is not known. If the hardware address of a Bluetooth appliance is known, then the master does not send an inquiry message to that Bluetooth appliance. After transmission of 16 identical page messages using 16 different (hopping) frequencies to the slaves from the master, the master and the slaves are in the "linked" status. This status is on average achieved within 0.6 seconds after switching on the Bluetooth appliances.

If no data currently needs to be transmitted, the master can switch the slaves to a hold mode, in order to save power. Further power saving modes, which are particularly suitable for use with mobile terminals, such as a mobile radio telephone, are the SNIFF mode and the PARK mode. In the SNIFF mode, a slave operates on a reduced cycle, while, in the PARK mode, a Bluetooth appliance remains synchronized but does not take part in the data traffic.

Bluetooth data transmission takes place on the basis of a combination of line switching and packet switching. Two different types of connection are provided.

1. Synchronous Connection Oriented (SCO)

SCO (synchronous connection oriented) communication provides a symmetrical, line-switched point-to-point communication link between a master and a slave. At regular time intervals, the master reserves time slots for data transmission. The master can transmit data to the slave in a defined time slot, a so-called SCO interval, which is referred to as the TSCO, and the slave can transmit data to the master in the time slot following this. A master can have up to 3 SCO communication links with one or more slaves at the same time. A slave can have up to 3 SCO communication links with the same master, or up to 2 SCO communication links with different masters, at the same time. SCO communication links are configured to allow efficient transmission of speech data. Speech data can be transmitted at 64 kbit/s by means of 1 SCO communication link. No data integrity checks are carried out on SCO communication links. If data is lost during transmission, it is not transmitted again since this would result in delays in the transmission of data to be transmitted subsequently. CVSD (Continuous Variable Slope Delta) modulation is typically used for speech data coding. CVSD modulation is a type of delta modulation in which the step width of a signal is progressively increased or decreased in order to match the signal as well as possible to an analogue input signal. In this implementation, only the changes (that is to say an increase or a decrease) from a previous value are indicated by a bit. CVSD modulation typically operates at a sampling rate of 32 kHz. Implementations also exist in which a lower sampling rate is used.

2. Asynchronous Connectionless (ACL)

A connectionless, packet-switching communication service is provided for ACL communication. An ACL communication link can be used on a channel provided that the channel is not reserved for an SCO communication link (that is to say SCO has priority over ACL). Only one ACL communication link can ever be set up between a master and a slave at one time. For the purposes of an ACL communication link, a master can also transmit data packets to all the slaves in the Bluetooth communication network. A data packet is broadcast in this way just by not stating any more specific destination address in the packet header of the data packet. ACL communication links are designed for efficient data transmission. When ACL communication links are used for data transmission, data integrity is taken into account to a very major extent, while less attention is paid to delays which could occur during data transmission. The transmission duration of a packet may be one time slot, three time slots or five time slots. A checksum is provided for reliability, for all types of data packets except one. Furthermore, Bluetooth provides two methods for forward error correction and one method for automatic transmission repetition (Automatic Repeat Request, ARQ), thus making it possible to ensure reliable data transmission. While an SCO communication link is always symmetrical, that is to say the forward channel and the backward channel of an SCO communication link always have the same bandwidth, an ACL communication link may be both symmetrical and asymmetric. Table 2 provides an overview of possible SCO communication links, whilst Table 3 provides an overview of possible ACL communication links.

TABLE 2

Overview of SCO communication links

| Type | Header length [Bytes] | Payload data [Bytes] | FEC | CRC | Maximum symmetrical data rate [kbit/s] |
|---|---|---|---|---|---|
| HV1 | n.a. | 10 | 1/3 | yes | 64.0 |
| HV2 | n.a. | 20 | 2/3 | yes | 64.0 |
| HV3 | n.a. | 30 | no | yes | 64.0 |
| DV | 1 D | 10+ (0-9) D | 2/3 D | yes | 64.0 + 57.6 D |
| EV3 | n.a. | 1-30 | no | yes | 96.0 |
| EV4 | n.a. | 1-120 | 2/3 | yes | 192.0 |
| EV5 | n.a. | 1-180 | no | no | 288.0 |

TABLE 3

Overview of ACL communication links

| Type | Header length [Bytes] | Payload data [Bytes] | FEC | CRC | Maximum symmetrical data rate [kbit/s] | Maximum asymmetric data rate (Uplink) [kbit/s] | Maximum asymmetric data rate (Downlink) [kbit/s] |
|---|---|---|---|---|---|---|---|
| DM1 | 1 | 0-17 | 2/3 | yes | 108.8 | 108.8 | 108.8 |
| DH1 | 1 | 0-27 | no | yes | 172.8 | 172.8 | 172.8 |
| DM3 | 2 | 0-121 | 2/3 | yes | 258.1 | 387.2 | 54.4 |
| DH3 | 2 | 0-183 | no | yes | 390.4 | 585.6 | 86.4 |
| DM5 | 2 | 0-224 | 2/3 | yes | 286.7 | 477.8 | 36.3 |
| DH5 | 2 | 0-339 | no | yes | 433.9 | 723.2 | 57.6 |
| AUX1 | 1 | 0-29 | no | no | 185.6 | 185.6 | 185.5 |

A time-division multiplexer method is used for duplex data transmission for both SCO communication links and ACL communication links. This allows two or more information streams to be transmitted by means of the same communication link, by allocating dedicated time slots to each information stream. Specific time intervals can be reserved for data packets which must be transmitted synchronously, and each of the data packets can be transmitted using its own (hopping) frequency. The transmission duration for one packet may be one time slot or else up to five time slots.

The Bluetooth SIG (Bluetooth Special Interest Group) Committee, which is dealing with the standardization of Bluetooth technology, defines not only the types of communication links described above but also application profiles, which are referred to as Bluetooth Profiles and are intended to allow Bluetooth appliances from different manufacturers to interact.

Both rules and protocols for a dedicated application scenario can be defined in an application profile. An application profile may be regarded as a vertical slice through all the protocol layers, since the obligatory protocol components are stipulated for each protocol layer, or the application-profile-specific parameters are defined for each protocol layer. This makes it possible to ensure a high level of interoperability. The use of application profiles gives the user the advantage that there is no need to manually match two or more Bluetooth appliances to one another. A plurality of application profiles can be used at the same time. Table 4 shows an overview of some of the important application profiles. The most important application profile is the Generic Access Profile (GAP), which allows the basic functionalities for setting up communication links for authentication, and on which all the other application profiles are based.

TABLE 4

Bluetooth Application Profiles

| Abbreviation | Profile | Application |
|---|---|---|
| GAP | Generic Access Profile | Basic method for authentication and setting up call reception |
| A2DP | Advanced Audio Distribution Profile | Wire-free stereo link for loudspeakers or headsets |
| SDAP | Service Discovery Application Profile | Service check of the currently visible neighbours |
| CIP | Common ISDN Access Profile | ISDN-CAPI Interface |
| PAN | Personal Area Network | Network link using Ethernet |

TABLE 4-continued

Bluetooth Application Profiles

| Abbreviation | Profile | Application |
|---|---|---|
| SPP | Serial Port Profile | Serial Interface |
| DUNP | Dial-Up Networking Profile | Internet access |
| CTP | Cordless Telephony Profile | Cordless telephony |
| HSP | Headset Profile | Cordless headset |
| HCRP | Hardcopy Cable Replacement Profile | Printing |
| HID | Human Interface Device | Keyboard and mouse connection (man-machine interface) |
| GOEP | General Object Exchange Profile | Object exchange |
| HFP | Hands Free Profile | Manufacturer-independent communication between a mobile telephone and a hands-free device |
| FTP | File Transfer Profile | File transfer |
| BIP | Basic Imaging | Image transmission |
| BPP | Basic Printing | Printing |
| FaxP | Fax Profile | Fax |
| IntP | Intercom Profile | Speech radio |
| PAN | Personal Area Network | Wire-free coupling using Ethernet (LAN) |
| OPP | Object Push Profile | Transmission, for example, of schedules and addresses |
| SAP | SIM Access Profile | SIM card access |
| GAVDP | Generic AV Distribution | Audio and video transmission |
| AVRCP | Audio Video Remote Control | Audio/video remote control |
| ESDP | Extended Service Discovery Profile | Extended service identification |
| SP | Synchronization Profile | File synchronization |

The ISO (International Organization for Standardization) have defined a reference model, comprising seven layers, for the description of manufacturer-independent communication systems, and this is referred to as the ISO/OSI model. The ISO/OSI model is used to described communication between different network appliances from different manufacturers. In this case, OSI is short for Open System Interconnection, that is to say open system for communication links. Most of the freely useable network protocols are based on this reference model, for example TCP/IP (Transport Control Protocol/Internet Protocol). The seven ISO/OSI model layers are defined such that they are built one on top of the other and such that the units in one layer can be used independently of the units in other layers. The units in layers 1 to 4 form the transport system, that is to say the communication channels are physically and logically defined in layers 1 to 4, and the units in layers 5 to 7 form the application system, and are used primarily for information representation. The seven layers of the ISO/OSI model are referred to, in their sequence from 1 to 7, as the physical layer, the data link layer, the network layer, the transport layer, the session layer, the presentation layer and the application layer.

Table 5 shows the English name, the German name and examples of protocols which are used for the respective layer, for each layer.

TABLE 5

ISO/OSI layer model

| No. | English name | German name | Examples |
|---|---|---|---|
| 7 | Application Layer | Anwendungsschicht | Web-Browser, Mail Program |
| 6 | Presentation Layer | Darstellungsschicht | HTML, XML, MIME |
| 5 | Session Layer | Sitzungsschicht | http, FTP, POP3, SMTP |
| 4 | Transport Layer | Transportschicht | TCP |
| 3 | Network Layer | Netzwerkschicht | IP |
| 2 | Data Link Layer | Datensicherungsschicht | PPP |
| 1 | Physical Layer | Physikalische Schicht | IEEE 802 |

The units in the application layer provide the interface between the respective user and application programs, for example to users of e-mail programs or data transmission services.

The units in the presentation layer provide data for use by the units in the application layer. In this case, for example, data is decoded, converted between different formats, encrypted or checked.

The units in the session layer provide services which are used for data transmission organization. For example, this ensures that communication links can be resumed despite temporary interruptions. By way of example, tokens are used in data packets for this purpose.

The units in the transport layer provide the capability to set up and clear communication links correctly, to synchronize communication links, and to distribute data packets for transmission by means of a plurality of communication links between the communication links (multiplexing). The transport layer forms the interface between the transport system and the application system according to the ISO/OSI model. Units in the transport layer are also used to segment data packets, making it possible to avoid data packet jams.

The network layer units carry out the switching and allocation of data packets. For example, they compile routing tables and carry out the routing process. If data packets are intended just to be forwarded, then the network layer units provide them with a new intermediate destination address, and they are not passed to units in higher layers. Coupling between different network topologies is also carried out in the network layer.

The units in the data link layer organize and monitor access to the data transmission medium. Bit streams to be transmitted are segmented and combined to form packets in the data link layer. Furthermore, data can be subjected to error checking, for example by attaching a checksum to a data packet. Data compression can also be carried out. Further tasks of the units in the data link layer include sequence monitoring, time monitoring and flow control.

The data link layer can be subdivided into two sublayers. The upper sublayer, that is to say the sublayer in the direction of the network layer, is referred to as the logical link control (LLC) layer, and the lower sublayer, that is to say the sublayer in the direction of the physical layer, is referred to as the medium access control (MAC) layer. The units in the MAC layer may have different functionalities, depending on the transmission medium being used (that is to say depending on the configuration of the physical layer). The main tasks of the MAC layer normally include:

Identification of where data packets (or frames) start and end (during reception of data) in the bit stream received from the units in the physical layer;

subdivision of the data stream into data packets and possibly insertion of additional bits into the data packet structure in order to allow the start and end of a data packet to be detected in a receiver (during transmission of data);

detection of transmission errors, for example by the insertion of a checksum during transmission and by appropriate check calculations on reception;

insertion and evaluation of MAC addresses during transmission and during reception, respectively;

access control, that is to say deciding when a plurality of units may access the physical transmission medium, granting access rights to the units.

The physical layer relates to characteristics of the transmission medium. By way of example, plug connections, wavelengths to be used and signal levels may be defined here. The physical layer units convert the bit sequences to be transmitted to formats which can be transmitted.

According to one exemplary embodiment of the invention, a communication terminal device is provided having a message generation circuit which is configured to generate an information inquiry message which specifies that another communication terminal device should transmit information about performance features of units in the physical layer or the data link layer of the other communication terminal device to that communication terminal device, and a transmitting circuit which is configured to transmit the information inquiry message.

According to another exemplary embodiment of the invention, a communication terminal device is provided having a message generation circuit which is configured to generate an instruction message for transmission to a second communication terminal device, which message specifies that the second communication terminal device should produce an information inquiry message which specifies that a third communication terminal device should transmit information about performance features of units in the physical layer or the data link layer of the third communication terminal device to the second communication terminal device;

should transmit the information inquiry message; and after receiving the information, should pass the information on to the communication terminal device;

and a transmitting circuit which is configured to transmit the instruction message.

According to a further exemplary embodiment of the invention, a communication terminal device is provided having a receiving circuit which is configured to receive an information inquiry message from another communication terminal device, which message specifies that the communication terminal device should transmit information about performance features of units in the physical layer or the data link layer of that communication terminal device to the other communication terminal device, a message generation circuit which is configured to generate an information message with the information, and a transmitting circuit which is configured to transmit the information message.

Furthermore, methods are provided for requesting communication terminal device information, and a method is provided for production of communication terminal device information, based on the communication terminal devices described above.

Exemplary embodiments of the invention clearly provide for a communication terminal device to be informed about the data transmission capabilities, for example the available transmitting/receiving modules, of other communication terminal devices located in the vicinity. The aim of transmission of the information inquiry message may, for example, be to search through the surrounding area for communication terminal devices which would be suitable communication partners. However, detailed information can also be requested about the units in the physical and/or data link layer (layers 1 and 2 in the ISO/OSI reference model).

This allows a communication terminal device to obtain an overview of possible communication partners, and to determine information about the communication capabilities of potential communication partners. By way of example, the communication terminal device can use this to decide which communication technology is best to use for communication.

One exemplary embodiment of the invention provides for a communication terminal to use another communication terminal device as a relay station, which transmits an information inquiry message to the other communication terminal device with the request for this message to be passed to a third communication terminal device, about which information should be determined. For example, this means that it is possible to use a first communication technology (for example radiation technology), by means of which the third communication terminal device cannot be accessed from the first communication terminal device, to allow the first communication terminal device to find out that the third communication terminal device supports a second communication technology by means of which it can be accessed from the first communication terminal device. This makes it possible to search the area surrounding the first communication terminal device more extensively and more fundamentally.

According to one exemplary embodiment of the invention, a communication terminal device can also use another communication terminal device as a relay station by using the other communication terminal device to pass any desired data and/or control commands (that is to say not only an information inquiry message) to a third communication terminal device.

The further refinements of the invention, which are described in conjunction with a communication terminal device, also apply in the same sense to the further communication terminal devices described above and to the methods for requesting communication terminal device information, as well as the method for generation of communication terminal device information.

The communication terminal device which transmits the information inquiry message may also have a receiving device which is configured to receive an information message with the information from the other communication terminal device.

The communication appliance may have a selection circuit which is configured to use the information to select units in the physical layer or the data link layer of the communication terminal device which should be used to set up a communication link to the other communication terminal device.

According to one exemplary embodiment of the invention, the communication terminal device has a control circuit which is configured to control the selected units in the physical layer or the data link layer of the communication terminal device such that a communication link is set up to the other communication terminal device.

The message generation circuit in the communication terminal device may be configured to produce the information inquiry message when a predetermined event occurs, and the transmitting circuit may be configured to transmit the information inquiry message when the predetermined event occurs.

By way of example, the predetermined event is the communication terminal device being switched on, a communication link between the communication terminal device and the other communication terminal device being terminated, a request from the user of the communication terminal device, a request from a program which is being run on the communication terminal device, or the reception of an instruction message which requests that the information inquiry message be produced and transmitted.

The transmitting circuit may be configured to transmit the information inquiry message to the other communication terminal device. However, the transmitting circuit may also be configured to transmit the information inquiry message to a third communication terminal device, with the request to the third communication terminal device to pass on the information inquiry message to the other communication terminal device.

The communication terminal device and the other communication terminal device are, for example, communication terminal devices for communication over a short distance. This should be understood as meaning communication terminal devices which are equipped with communication technologies for communication in the near surrounding area, for example up to 10 meters, 50 meters or 100 meters. The communication terminal device (and, in a corresponding manner, the other communication terminal device) may, however, also for example be a mobile radio communication terminal device which also supports a communication technology for a short distance, for example a near-field communication technology. By way of example, the communication terminal device may also be a printer or some other appliance which is equipped with a communication interface, for example a Bluetooth interface.

The units in the physical layer or the data link layer make it possible, for example, to communicate using Bluetooth, IrDA (Infrared Data Association) or WLAN (Wireless Local Area Network). The units in the physical layer or the data link layer accordingly form, for example, a Bluetooth transmitting/receiving module, an IrDA transmitting/receiving module, or a WLAN transmitting/receiving module.

The units in the physical layer or the data link layer allow communication, for example, using the ISM frequency band or the UWB frequency band. The units in the physical layer or the data link layer accordingly provide, for example, a Bluetooth transmitting/receiving module for communication using the "conventional" Bluetooth communication technology at 2.4 GHz (Legacy Bluetooth) or a transmitting/receiving module for communication using the UWB frequency band, according to WiMedia.

By way of example, the communication terminal device has a memory circuit which is configured to store the information (requested by the other communication terminal device), with the information being associated by means of identifications or addresses of the units in the physical layer or the data link layer with the units in the physical layer or the data link layer.

FIG. 1 shows a Bluetooth architecture 100.

The units in the Bluetooth architecture 100 are subdivided into a physical layer 101, a data link layer 102, a network layer 103 and a session layer 104. In Bluetooth, the physical layer 101 is referred to as the radio layer, and the data link layer 102 is referred to as the baseband layer in Bluetooth, while the network layer 103 is referred to in Bluetooth as the link management layer and the session layer 104 is referred to in Bluetooth as the L2CAP (Logical Link Control and Adaptation Protocol) layer.

The physical layer 101, the data link layer 102 and the network layer 103 are combined to form a unit, which is referred to as the Bluetooth control unit (Bluetooth Controller) 105.

The interface between the Bluetooth control circuit 105 and the higher layers is referred to as the HCI (Host to Controller Interface) interface 106. The HCI interface 106 provides service access points 107 to the Bluetooth control circuit 105. The units in the session layer 104 are required only for ACL communication links, but not for SCO communication links. The session layer 104 has a channel manager 108, which is responsible for generating, managing and clearing L2CAP channels for transportation of data streams. The session layer 104 also has an L2CAP resource manager 109 which, for example, is responsible for scheduling tasks.

The network layer has a link manager 110 which is responsible for generating, modifying and clearing logical links.

A device manager 111 may be allocated both to the network layer 103 and to the data link layer 102, and controls the general response of the appropriate Bluetooth appliance. By way of example, it is responsible for processes which do not relate directly to data transport, for example checking whether there are Bluetooth-compatible appliances in the vicinity, for setting up connections to other Bluetooth-compatible appliances, or for ensuring that the corresponding Bluetooth-compatible appliance can itself be found by other Bluetooth-compatible appliances.

The data link layer 102 has a baseband resource manager 112, which is responsible for accessing the radio medium. The data link layer 102 also has a link controller 113, which is responsible for coding and decoding the data packets used for data transmission.

The physical layer 101 has a radio-frequency (RF) unit 114 which is responsible for transmission and reception of data packets on the physical channel.

The strict subdivision in the ISO/OSI mode is not always complied with in actual communication systems. For example, parts of the network layer extend into the transport layer in the Bluetooth architecture 100. The presentation layer and the application layer are not shown in FIG. 1, for the sake of simplicity. In FIG. 1, control signals (for appliance control and for transport control) are represented by the arrows 115 (control plane, C-plane), and data signals are represented by the arrows 116 (user plane, U-plane). In the case of Bluetooth, interoperability is guaranteed on the one hand by providing a clearly defined interface between the Bluetooth control circuit 105 and the Bluetooth host, that is to say the units in the layers upwards from the network layer, specifically the HCI interface 106, and by the interchange between units in the same layers of two different Bluetooth systems, for example different communication terminals, which communicate with one another by means of Bluetooth, being clearly defined. A data interchange such as this is represented by the arrows 117 in FIG. 1.

The Bluetooth SIG Committee intends that, in future, a further alternative physical transmission layer, which allows a data rate of more than 100 Mbit/s, will also be included, in addition to the proven physical transmission layer, which allows data rates of up to 2.2 Mbit/s (during downloading in accordance with Bluetooth Version 2.0 using the Enhanced Data Rate).

This is intended to be done, for example, using UWB (Ultra Wide Band) technology in accordance with the WiMedia Alliance Standard, which is based on OFDM (Orthogonal Frequency Division Multiplexing).

By way of example, OFDM is used for Digital Video Broadcasting (DVB), Digital Audio Broadcasting (DAB), x Digital Subscriber Line (xDSL) and Power Line Communications (PLC).

In OFDM, a plurality of carrier signals are modulated, and a signal is transmitted by modulation of orthogonal carrier signals. A data stream in OFDM is accordingly subdivided into N parallel data streams (at a correspondingly lower data rate), and each of the N data streams is transmitted by means of its own carrier signal. The orthogonality of the carrier signals is achieved in that a specific minimum frequency separation is maintained between the carrier signals. In contrast to Frequency Division Multiplexing (FDM) the carrier signals are allowed to spectrally overlap in OFDM, thus making it possible to achieve considerably better spectral efficiency than in the case of FDM. This advantage becomes greater, the greater the number of carrier signals that are used.

FIG. 2 shows a Bluetooth architecture 200 according to one exemplary embodiment of the invention.

According to the Bluetooth architecture 200, a plurality of user profiles 201 are provided, and are managed by an application/profile management entity 202.

The application/profile management entity 202 is offered service access points 203 (obviously from the layers below this), for example a Service Access Point (SAP) for synchronous communication links, a service access point for control tasks, a service access point for tasks relating to the Service Discovery Protocol (SDP), a service access point for management/control of an L2CAP unit (L2CAP module) 211 and an AMP manager 215, as well as a data access point for tasks relating to management/control of the AMP manager 215 (on its own). The following text will describe the operation and significance of the AMP manager 215 and of the AMPs in more detail.

The Bluetooth architecture 200 has a transmitting/receiving module 204 which, for example, is designed on the basis of the Bluetooth control circuit 105, as has been explained with reference to FIG. 1. The transmitting/receiving module accordingly has an HCI interface 216, which provides service access points for units in higher layers.

The Bluetooth architecture 200 also has further transmitting/receiving modules 205, each of which likewise has an HCI interface 206, which provides service access points for higher layers.

The further transmitting/receiving modules each have units in the MAC layer (or in general the data link layer) and the physical layer. Since they provide alternative transmission methods to the transmitting/receiving module 204, they are combined within the expression Alternative MAC PHY (AMP). Every further transmitting/receiving module 205 therefore has an AMP 207.

Various further units or circuits are provided between the transmitting/receiving modules 204, 205 and the service access points 203 which form the interface to the application layer. For example, a unit is provided for managing synchronous data traffic 208, a control unit 209, an SDP unit 210 for carrying out tasks relating to the SDP protocol, and the L2CAP unit 211 for carrying out tasks relating to the L2CAP protocol. The L2CAP unit provides control unit functions 212 and units for handling payload data 213.

A multi-radio-selection/routing circuit 214 is also provided and selects which of the transmitting/receiving modules 204, 205 will be used to transmit and receive data, and, for example, distributes data to be transmitted as appropriate between the transmitting/receiving modules 204, 205.

The Bluetooth architecture 200 also has the AMP manager 215, whose purpose will be explained in the following text.

In this case, it is assumed that a communication terminal device has the Bluetooth architecture 200. By way of example, the AMP manager 215 can then determine which adjacent communication terminal devices of the same type can be accessed by the communication terminal device. In this case, another communication terminal device is "of the same type" as the communication terminal device if it supports the "conventional" Bluetooth radio technology, which operates at 2.4 GHz, that is to say in the ISM frequency band (Legacy Bluetooth), in the same way as the communication terminal device itself (by means of the transmitting/receiving module 204).

An other communication terminal device is "adjacent" to the communication terminal device if it can be addressed by means of the transmitting/receiving module 204 or by means of one of the further transmitting/receiving modules 205, that is to say a communication link can be set up to the other communication terminal device, because it is within range of the respective transmitting/receiving module 204, 205. The AMP manager 215 can determine various characteristics of adjacent communication terminal devices of the same type, periodically or on an event-controlled basis. This is initiated, for example, by the communication terminal device which in this case is the host for the AMP manager. By way of example, the following information is determined about another adjacent communication terminal device of the same type:

The appliance class of the other communication terminal device;
the information about the transmitting/receiving modules with which the other communication terminal device is equipped;
the activity of the transmitting/receiving modules with which the other communication terminal device is equipped, for example the information about whether a transmitting/receiving module is on (active), off (inactive) or is in a park status (for example a standby mode);
information about the type of transmitting/receiving modules with which the other communication terminal device is equipped, for example whether a transmitting/receiving module transmits data in accordance with WiMedia using the UWB frequency band;
information about the range of the transmitting/receiving modules with which the other communication terminal device is equipped, for example information about the minimum guaranteed range of a transmitting/receiving module, the currently determined range of a transmitting/receiving module, or the maximum possible range of a transmitting/receiving module;
information about the frequency band groups supported by the transmitting/receiving modules with which the other communication terminal device is equipped, and, if appropriate, identification of whether this is optional or obligatory;
appropriate information (existence, activity, type, appliance class, range, . . . ) about further communication terminal devices of the same type which can be accessed from the other communication terminal device, for example further communication terminal devices which are adjacent to the other communication terminal device.

The AMP manager can also have the functionality of remotely controlling an adjacent communication terminal device of the same type. By way of example, an adjacent communication terminal device of the same type can request that the adjacent communication terminal device of the same type carry out an action or a command and, if appropriate, transmit the result of the action or of the command back to the requesting communication terminal device.

The AMP manager 215 also has the functionality of managing the determined information about adjacent communication terminal devices of the same type. Furthermore, information about communication terminal devices which have a neighbourhood degree of more than 1 are managed. The expression a neighbourhood degree of more than 1 should be understood as meaning further communication terminal devices which cannot be addressed directly by the communication terminal device because the range is inadequate but, for example, only by means of a communication terminal device which is adjacent to the communication terminal device and acts as a relay station from the communication terminal device to the further communication terminal devices.

If information about transmitting/receiving modules is stored by the AMP control circuit, then this can be associated in various ways with the communication terminal devices to which they belong. Options relating to this are, for example:
transmitting/receiving modules are provided with unique transmitting/receiving module addresses;
a transmitting/receiving module is assigned an identification which is a combination of an identification of the AMP manager of the corresponding communication terminal device (that is to say of the communication terminal device which has that transmitting/receiving module) and type details for that transmitting/receiving module;
a transmitting/receiving module is assigned a combined address, which comprises an identification of the AMP manager (for example a Bluetooth protocol stack ID) of the corresponding communication terminal device and a sequential number of the transmitting/receiving module.

The AMP manager 215 can support the communication terminal device being used as a relay station by another communication terminal device. In this case, the AMP manager 215 ensures that data is passed to further communication terminal devices which have a neighbourhood degree of more than 1 with respect to the other communication terminal device. In this case, by way of example, information about the transmitting/receiving modules of the further communication terminal devices or information about the further communication terminal devices (for example appliance class) can be taken into account.

By way of example, another communication terminal device can use the communication terminal device to send data to be printed to a printer which itself is beyond range of the other communication terminal device.

The appliance class is, for example, an expression of the main task of a communication terminal device, for example "printer", "MP3 player", "camera" or "personal computer".

With reference to FIG. 3, the following text will explain a procedure describing how a communication terminal device which has the Bluetooth architecture 200 determines from another communication terminal device which, for example, likewise has the Bluetooth architecture 200 information about the transmitting/receiving modules in the other communication terminal device, or general information about the performance features of the other communication terminal device.

FIG. 3 shows a flowchart 300 based on one exemplary embodiment of the invention.

If the communication terminal device wishes to set up a communication link to another communication terminal device, then it is necessary for another communication terminal device such as this to be within range. The communication terminal device therefore has the functionality of using a scan to search the area surrounding the communication terminal device for possible communication partners, that is to say for other communication terminal devices to which the communication terminal device can set up a communication link. In one exemplary embodiment, a scan such as this is carried out for all or for a selected set of the transmitting/receiving modules with which the communication terminal device is equipped, that is to say a check is carried out for all (or for a selected set) of the transmitting/receiving modules of the communication terminal device to determine whether there is a suitable communication partner for the respective transmitting/receiving module, that is to say a transmitting/receiving module of another communication terminal device, to which the transmitting/receiving module can set up a communication link. This has a positive effect since different transmitting/receiving modules may have different ranges and, for example, no communication partner may be found for a first transmitting/receiving module since either none of the communication terminal devices in the surrounding area are equipped with a transmitting/receiving module such as this, or they are out of range but a communication partner can be found by means of a second transmitting/receiving module.

In 301, the transmitting/receiving module for which a scan should be carried out is determined first of all. By way of example, the described procedure can be carried out for all the transmitting/receiving modules, with a sequence of transmitting/receiving modules being predetermined.

In 302, a search is carried out for a communication partner for the selected transmitting/receiving module. This means a search is carried out in the area surrounding the communication terminal device for a further transmitting/receiving module which can communicate with that transmitting/receiving module, that is to say with which the transmitting/receiving module can set up a communication link. By way of example, a search is carried out for a further transmitting/receiving module which is of the same type as the transmitting/receiving module, for example a Legacy Bluetooth module, a module for data transmission by means of the UWB frequency band using WiMedia, etc.

If a communication partner is found for the transmitting/receiving module, as is assumed in the following text, then the transmitting/receiving module is used in 303 to transmit a scan inquiry message to the communication partner. This may be a request for basic information, which is referred to as a basic scan request, or a request for comprehensive information, which is referred to as a full scan request.

In the case of a basic scan request, the request covers only information about the further transmitting/receiving module which has been found in the search for a communication partner for the transmitting/receiving module. This means that no information about any further transmitting/receiving modules contained in it is requested from the other communication terminal device which was found in 302, but only information about that transmitting/receiving module which has been found as the communication partner for the selected transmitting/receiving module.

In contrast to this, in the case of a full scan request from the other communication partner, information is requested about all the transmitting/receiving modules which the other communication terminal device has. This request is used when the communication terminal device wishes to create a complete list of all transmitting/receiving modules of the other communication terminal device.

When a basic scan request has been transmitted, then the communication terminal device receives, in 304, the corresponding response from the other communication terminal device, and this is referred to as a basic scan response. The basic scan response contains, for example, the following information:

the appliance class of the other communication terminal device;

for the transmitting/receiving module of the other communication terminal device which has been found as a communication partner for the transmitting/receiving module, a transmitting/receiving module address for unique identification of that transmitting/receiving module; a combined address may be provided, for example, for this purpose, which comprises an identification of the AMP manager of the other communication terminal (AMP manager ID) or an identification of the Bluetooth units in the other communication terminal device (for example a Bluetooth protocol stack ID) and a sequential number of the transmitting/receiving module;

information about the activity of the transmitting/receiving module of the other communication terminal device, for example whether the transmitting/receiving module is on, is off or is in a standby mode;

information about the type of transmitting/receiving module in the other communication terminal device (for example the details as to whether the transmitting/receiving module is designed for data transmission by means of the UWB frequency band using WiMedia);

information about the range of the transmitting/receiving module of the other communication terminal device, for example a minimum guaranteed range, a currently determined range or a maximum possible range;

information about the frequency band groups supported by the transmitting/receiving module in the other communication terminal device, for example including identification as to whether this is optional or obligatory.

When the communication terminal device transmits a full scan request in 303, then it receives the appropriate response in 305, and this is referred to as a full scan response. This includes, for example, the following information:

the appliance class of the other communication terminal device;

details of the transmitting/receiving modules contained in the other communication terminal device;

analogously to the information in a basic scan response, information about each transmitting/receiving module in the other communication terminal device, such as a transmitting/receiving module address, information about the activity, information about the type, information about the range and information about the frequency band groups supported for all transmitting/receiving modules.

A decision is made in 306 to determine whether scans should be carried out for transmitting/receiving modules other than the selected transmitting/receiving module. If not, the procedure is ended in 307. If scans should be carried out for other transmitting/receiving modules, the next transmitting/receiving module for which a scan should be carried out is selected in 301.

As mentioned above, the AMP manager 215 can retrieve information about adjacent communication terminal devices of the same type, for example information about performance features of adjacent communication terminal devices of the same type, periodically or on an event-controlled basis. This is controlled, for example, by the host of the AMP manager, that is to say the communication terminal device which has the AMP manager 215. In this functionality, for example, all the information which is required to set up a communication link to another communication terminal device is determined. Once this has been determined, the requesting communication terminal device has information about the status and the characteristics of the adjacent other communication terminal device of the same type. By way of example, when data such as this has been determined for a plurality of other communication terminal devices, the determined data is then sorted on the basis of communication terminal devices and made available to the requesting communication terminal device for use in the course of other activities, for example for setting up a communication link.

By way of example, a communication terminal device determines information about another communication terminal device using the principle that the AMP manager of the requesting communication terminal device requests information from the AMP manager of the other communication terminal device, and the other communication terminal device sends back the information. This is illustrated in FIG. 4.

FIG. 4 shows a message flowchart 400 according to one exemplary embodiment of the invention.

The illustrated message flow takes place between a first AMP manager 401 of a first communication terminal device and a second AMP manager 402 of a second communication terminal device. In 403, the first AMP manager 401 transmits an inquiry message 405 with a request for information about the performance features of the second communication terminal device, and this is referred to as a property request.

The second AMP manager 402 produces a corresponding response message 406, which is referred to as a property response and transmits this to the first AMP manager 401 in 404. The information about the performance features of the second communication terminal device can be checked periodically (that is to say after regular time intervals) or on an event-controlled basis. By way of example, the information is always checked when a specific event occurs, for example when a communication link between the first communication terminal device and the second communication terminal device collapses, the user of the first communication terminal device requests that information be checked, or an application which is installed on the first communication terminal device requests that the information be checked.

The inquiry message 405 contains the specification of which information is requested from the second communication terminal device. This information is, for example:

the appliance class of the second communication terminal device;
the details of the transmitting/receiving module with which the second communication terminal device is equipped;
the activity of the transmitting/receiving modules with which the second communication terminal device is equipped, for example whether they are on, are off or are in a standby mode;
the type of transmitting/receiving modules in the second communication terminal device;
the ranges of the transmitting/receiving modules in the second communication terminal device;
the frequency band groups supported by the transmitting/receiving modules in the second communication terminal device;
analogous information about further communication terminal devices which can be accessed from the second communication terminal device.

As mentioned, the AMP manager 215 can request an adjacent communication terminal device of the same type to carry out an action or a command, and if required to transmit the result of this action or the command. This functionality can be used, for example, for a communication terminal device to determine information about a further communication terminal device which is beyond range of the communication terminal device itself. For example, another communication terminal device can be used to carry out a scan and, for example, to transmit a basic scan request or a full scan request to the further communication terminal device, which itself has a higher neighbourhood degree than 1 from the point of view of the communication terminal device. The results of a scan such as this can be transmitted from the other communication terminal device to the communication terminal device. One example of a request to another communication terminal device to carry out an action will be explained in the following text with reference to FIG. 5.

FIG. 5 shows a message flowchart 500 according to one exemplary embodiment of the invention.

The illustrated message flow takes place between a first AMP manager 501 for a first communication terminal device, a second AMP manager 502 for a second communication terminal device, and a third AMP manager 503 for a third communication terminal device. In 504, the first AMP manager 501 sends an instruction in the form of an instruction message 508, which is referred to as a remote instruction, to the second manager 502. The instruction message 508 contains, for example, the following information:

the details of the instruction which the second manager 502 can carry out, for example an instruction name;
a return address, that is to say in this case an address for the first communication terminal device, to which the result or information about the result of carrying out the requested instruction should be returned,
other parameters such as a validity period for the requested instructions.

This example assumes that the first AMP manager 501 is requested by the AMP manager 502 to send a property request message 509 to the third AMP manager 503, and in this way to determine information about the third communication terminal device. The second AMP manager 502 accordingly transmits a property request message 509 to the third AMP manager 503 in 505.

Analogously to the message flow illustrated in FIG. 4, the third AMP manager 503 responds to the property request message 509 with a property response 510 in 506.

In 507, the second AMP manager 502 transmits an instruction response message 511, which is referred to as a remote results message, to the first AMP manager 501. The instruction response message 511 in this example contains the information from the property response message 510, that is to say the information about the third communication terminal device.

In general, the remote control functionality by means of a remote instruction message makes it possible for a requesting appliance to remote control an adjacent communication terminal device of the same type and, in particular, to obtain an overview of the communication terminal devices which are beyond the range of the communication terminal device itself, for example by requesting that a scan be carried out. By way of example, this allows communication networks to be set up between communication terminal devices, at least some of which have a neighbourhood degree of more than 1 between them. Furthermore, it is possible for a communication terminal device to use, for example, a first transmitting/receiving module to find out that a further communication terminal device can be accessed by a second transmitting/receiving module, despite being outside the range of the first transmitting/receiving module, since this second transmitting/receiving module has a longer range, and to find out that further communication terminal devices are equipped with a corresponding transmitting/receiving module.

The remote results message 511 may in general contain results of the requested instruction or action, for example also the information that it has not been possible to carry out the action, or the like.

When information has been determined about other communication terminal devices and the transmitting/receiving module, then the AMP manager 215 manages the determined information. In particular, the AMP manager 215 allocates transmitting/receiving modules to the communication terminal devices which have them.

Since the other communication terminal devices may have any number of transmitting/receiving modules, it is necessary for them to be unambiguously associated with the respective communication terminal devices, and to be unambiguously addressed. According to some embodiments of the invention, the following options are provided for identification or addressing of a transmitting/receiving module:

a transmitting/receiving module is addressed by means of a transmitting/receiving module address, which is a hardware address; by way of example, this is an address similar to a MAC address in the case of Ethernet; one example of an address such as this is 123.456.789;

the transmitting/receiving module is addressed using a combined address, which is a combination of an identification of the communication terminal device which has the transmitting/receiving module, or an address of the AMP manager for this communication terminal device and a sequential number of the transmitting/receiving module. By way of example, the identification of the AMP manager for the communication terminal device is that the transmitting/receiving module has "123" and the number of the transmitting/receiving module, based on sequential numbering of all the transmitting/receiving modules of the communication terminal device which the transmitting/receiving module has, is "2"; by way of example, "1232" is used as the address of the transmitting/receiving module in this case;

the transmitting/receiving module is identified by an identification of the AMP manager for the communication terminal device which has the transmitting/receiving module, and details of the type of transmitting/receiving module; if, for example, the identification of the AMP manager is "123" and the transmitting/receiving module type is "UWB", then the resultant address for the transmitting/receiving module is "123UWB"; alternatively, the type may also be coded in the form of a numerical value, for example the transmitting/receiving module type may be "0x1A", and the resultant address is chosen to be 12326 (with 0x1A being interpreted as a hexadecimal number).

At the same time, the identification of an AMP manager for a communication terminal device can be used as the identification of the communication terminal device, so that information about communication terminal devices can be unambiguously associated with communication terminal devices.

Information about communication terminal devices can be managed by means of the identification of the respective AMP manager in conjunction with the sequential numbers of the transmitting/receiving modules. Alternatively, as mentioned, transmitting/receiving module addresses can also be transmitted for information management purposes. In this case, however, care should be taken to ensure that the transmitting/receiving module addresses can be associated with the corresponding communication terminal devices (for example when a property request is used to request information about transmitting/receiving modules).

The formation of an unambiguous transmitting/receiving module address from an identification of an AMP manager and of a transmitting/receiving module type is possible only when there is just one transmitting/receiving module of this type in the corresponding communication terminal device.

The AMP manager 215 supports a relay function, so that two communication terminal devices can communicate via a communication terminal which is acting as a relay. This functionality can also be provided by another unit in the communication terminal device. The relay functionality (or relay station functionality) will be explained in the following text with reference to FIGS. 6 and 7.

Figure 6:
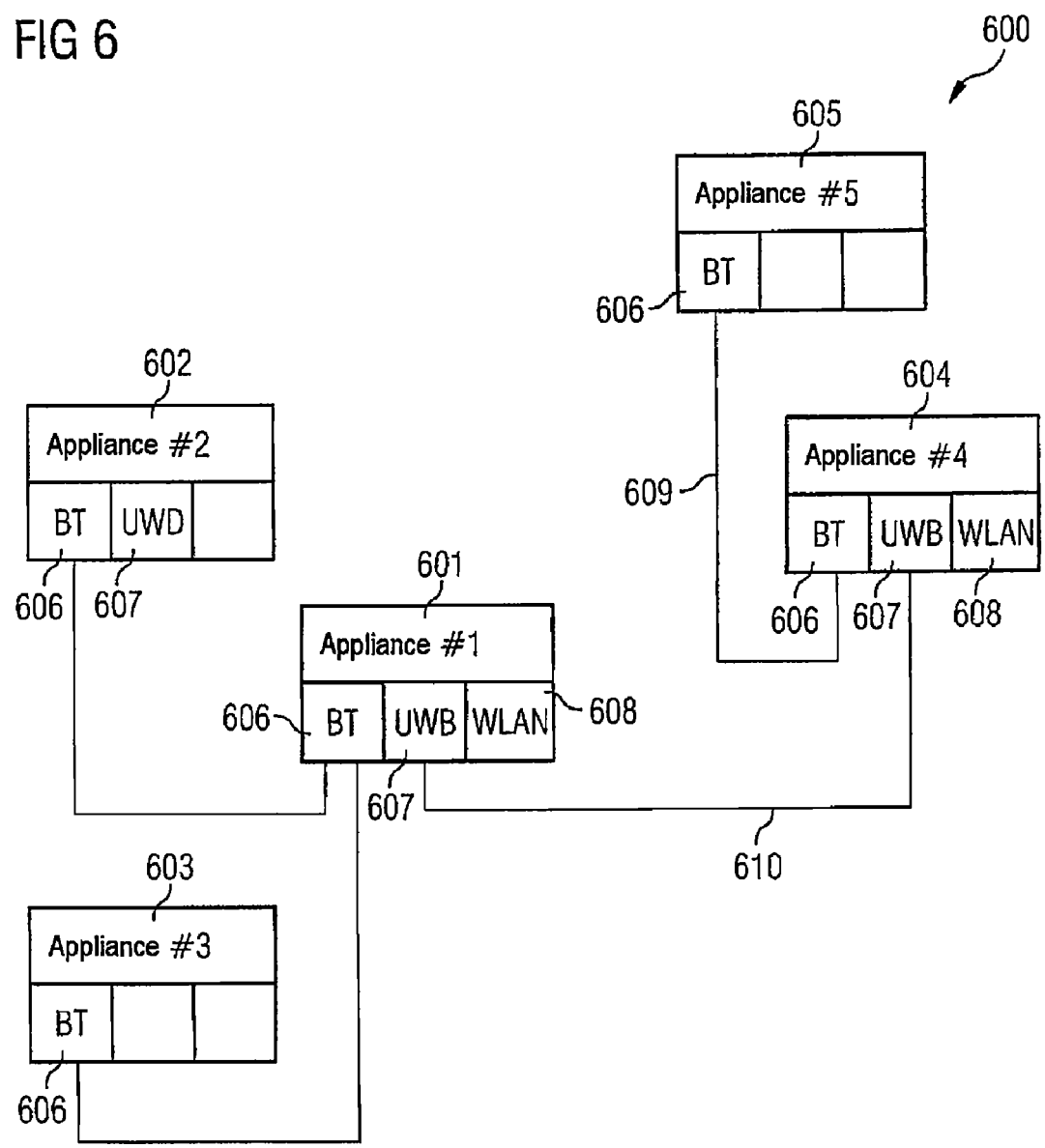
FIG. 6 shows an arrangement of communication terminals according to one exemplary embodiment of the invention.

FIG. 6 shows an arrangement of communication terminals 600 according to one exemplary embodiment of the invention.

The arrangement of communication terminal devices 600 has a first communication terminal device 601, a second communication terminal device 602, a third communication terminal device 603, a fourth communication terminal device 604 and a fifth communication terminal device 605.

The first communication terminal device 601, the second communication terminal device 602, the third communication terminal device 603, the fourth communication terminal device 604 and the fifth communication terminal device 605 are each equipped with a Bluetooth transmitting/receiving module 606 which supports data transmission based on the "conventional" Bluetooth technology, transmitting data (Bluetooth Legacy) at 2.4 GHz (ISM frequency band). The first communication terminal device 601, the second communication terminal device 602 and the fourth communication terminal device 604 are also equipped with a UWB transmitting/receiving module 607, which supports data transmission using the UWB frequency band in accordance with the WiMedia Standard.

The first communication terminal device 601 and the fourth communication terminal device 604 are also equipped with a WLAN transmitting/receiving module 608, which allows data transmission in accordance with a WLAN Standard.

In this example, the fourth communication terminal device 604 can act as a relay station between the first communication terminal device 601 and the fifth communication terminal device 605. By way of example, the first communication terminal device 601 and the fifth communication terminal device 605 cannot communicate by means of their Bluetooth transmitting/receiving modules 606 since they are not within range. The fourth communication terminal device 604 is, however, within range of the fifth communication terminal device 605, so that a first communication link 609 can be set up between the fourth communication terminal device 604 and the fifth communication terminal device 605 by means of the Bluetooth transmitting/receiving modules 606 in the fifth communication terminal device 605 and in the fourth communication terminal device 604.

It is also assumed that a second communication link 610 has been set up between the first communication terminal device 601 and the fourth communication terminal device 604, by means of the UWB transmitting/receiving modules 607 in the first communication terminal device 601 and the fourth communication terminal device 604. The first communication terminal device 601 can now transmit data and/or instructions to the fifth communication terminal device 605 by first of all transmitting the data to the fourth communication terminal device 604, together with the request for the fourth communication terminal device 604 to pass on the data and/or instructions to the fifth communication terminal device 605 by means of the first communication link 609.

The relay station functionality of the fourth communication terminal device 604 therefore allows the first communication terminal device 601 to communicate with the fifth communication terminal device 605 even though the fifth communication terminal device 605 has a neighbourhood degree of greater than 1 for the first communication terminal device 601. The relay station, that is to say the fourth communication terminal device 604, has the neighbourhood degree of 1 for the fifth communication terminal device 605 and the first communication terminal device 601.

By way of example, the fifth communication terminal device 605 is a printer by means of which the first communication terminal device 601 can print out documents, even though the first communication terminal device 601 and the fifth communication terminal device 605 are not within range of one another.

When the fourth communication terminal device 604 receives data or instructions to be forwarded to the fifth communication terminal device 605, then it or they are first of all temporarily stored and are preprocessed for being passed on, for example by being matched to the respective transmission format. In this case, the data to be forwarded must, for example, be matched to the transmission format used by the Bluetooth transmitting/receiving modules 606. The data matching, for example to the transmission formats, is carried out, for example, by units in the L2CAP layer.

The relay station, in this example the fourth communication terminal device 604, passes the data to be forwarded to the fifth communication terminal device 605 on the basis of an unambiguous identification of the AMP manager for the fifth communication terminal device 605. In addition to the AMP manager identification, a sequential number of the Bluetooth transmitting/receiving module 606 in the fifth communication terminal device 605, or else the type of Bluetooth transmitting/receiving module 606 in the fifth communication terminal device 605, can optionally be stated, or the data can also be passed on to the fifth communication terminal device 605, with an unambiguous address being stated for the Bluetooth transmitting/receiving module 606 in the fifth communication terminal device 605.

If the fourth communication terminal device 604 knows only an identification of the AMP manager in the fifth communication terminal device 605, then it can select a suitable transmitting/receiving module in the fifth communication terminal device 605 for data transmission. In this example, however, only the Bluetooth transmitting/receiving module 606 in the fifth communication terminal device 605 is suitable, because the fifth communication terminal device 605 is not equipped with any more transmitting/receiving modules.

Overall, the relay station, in this example the fourth communication terminal device 604, offers a routing functionality. By way of example, address management tables with addresses for all the accessible transmitting/receiving modules are stored for this purpose, so that units in the L2CAP layer can access them, such that the fourth communication terminal device 604 can transfer data and/or control commands to be forwarded, to a suitable transmitting/receiving module for transmission.

One procedure for passing on data and/or instructions (control commands) will be explained in the following text with reference to FIG. 7.

Figure 7:
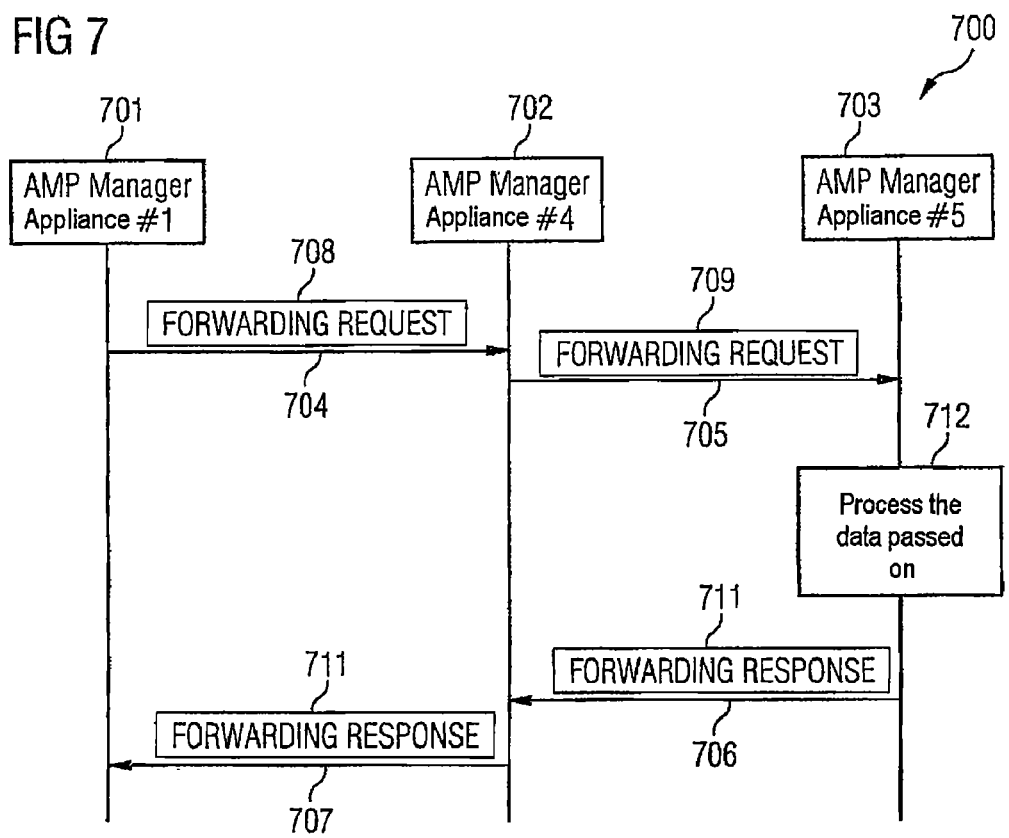
FIG. 7 shows a message flowchart according to one exemplary embodiment of the invention.

FIG. 7 shows a message flowchart 700 according to one exemplary embodiment of the invention.

The illustrated message flow takes place between a first AMP manager 701, which is the AMP manager for the first communication terminal device 601, a second AMP manager 702, which is the AMP manager for the fourth communication terminal device 604, and a third AMP manager 703, which is the AMP manager for the fifth communication terminal device 605.

In 704, the first AMP manager 701 transmits a forwarding request message 708 to the second AMP manager 702. The forwarding request message 708 is referred to as a forwarding request. The forwarding request message 708 contains, for example, the following information:

the destination address, that is to say the address to which the data and/or control commands to be forwarded should in the end be forwarded; by way of example, the destination address is an identification of the third AMP manager 703 and a sequential number for the Bluetooth transmitting/receiving module 606 in the fifth communication terminal device 605, or an identification for the third AMP manager 703, with details of the type of Bluetooth transmitting/receiving module 606 in the fifth communication terminal device 605, or an unambiguous address for the Bluetooth transmitting/receiving module 606 in the fifth communication terminal device 605;

an address of the sender, in this example the first AMP manager 701;

optionally, the minimum data transmission rate which should be used for passing on the data and/or control commands to be forwarded.

The data to be forwarded is passed in step 705 from the second AMP manager 702 to the third AMP manager 703 in the form of a forwarding message 709. The forwarding message 709 is likewise referred to as a forwarding request in this example. In 712, the data which has been passed on is then processed by the third AMP manager 703, or else is processed by other units in the fifth communication terminal device 605.

The fifth communication terminal device 605 responds in 706 in the form of a response message 711 which, in 707, is passed from the fourth communication terminal device 604 to the first communication terminal device 601, to be precise to the first AMP manager 701.

The response message 711 is referred to as a forwarding response and, for example, contains the following information:

the address of the first communication terminal device 601;
the address of the fifth communication terminal device 605 (that is to say the original destination address of the data to be forwarded);
information about the status of the forwarding process, for example information as to whether the data has been forwarded successfully and has been received without errors, whether it has been possible to carry out the specified control commands correctly, or else information about the results of the instructions to be carried out in accordance with the control commands.

Figure 8:
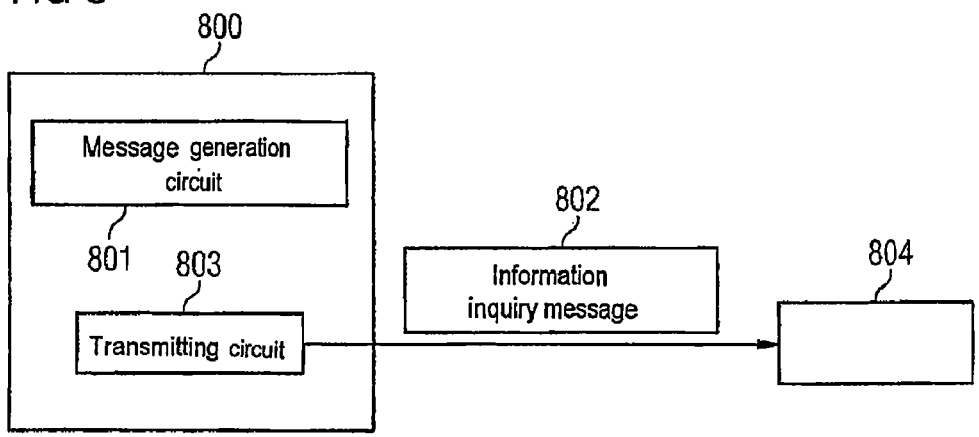
FIG. 8 shows a communication terminal according to one exemplary embodiment of the invention.

According to one exemplary embodiment of the invention, a communication terminal device is provided as illustrated in FIG. 8.

FIG. 8 shows a communication terminal 800 according to one exemplary embodiment of the invention.

The communication terminal 800 has a message generation circuit 801, which produces an information inquiry message 802 which specifies that another communication terminal device should transmit information about performance features of units in the physical layer or the data link layer of the other communication terminal device to that communication terminal device 800.

The communication terminal device 800 also has a transmitting circuit 803 which is configured to transmit the information inquiry message 802 to a receiver 804, for example to the other communication terminal device.

According to one exemplary embodiment of the invention, a circuit is provided in one communication terminal device (and is referred to in the above exemplary embodiments as the AMP manager) which can determine which adjacent appliances of the same type are present, can retrieve and manage information about other communication terminal devices, can remotely control other communication terminal devices (that is to say can request that an instruction be carried out), and supports a relay station functionality of the communication terminal device.

In one exemplary embodiment of the invention, the communication is carried out in the course of one of the abovementioned functionalities of second communication terminal devices in both communication terminal devices by means of the respective AMP manager. By way of example, the AMP manager for a communication terminal device requests information from the AMP manager for an adjacent communication terminal device (with the neighbourhood degree 1, for example a communication terminal device of the same type), instructs the adjacent communication terminal device to carry out an instruction, or to pass data to a third communication terminal device. Once an instruction has been carried out, the adjacent communication terminal device transmits a response which, for example, contains results from the instruction being carried out, to the communication terminal device. When passing on data and/or instructions to a third communication terminal device (with a neighbourhood degree greater than 1 from the point of view of the communication terminal device), the adjacent communication terminal device is used as a relay station (intermediate station).

The exemplary embodiments described above can be implemented in software, that is to say by means of one or more computer programs, in hardware, that is to say by means of one or more specific electronic circuits, or in any desired hybrid form, that is to say with any desired split between software and hardware.

In addition, it should be noted that the invention is not restricted to the embodiments described above, and in particular is not restricted to an ad-hoc communication network, and is not even restricted to a Bluetooth communication network. Any communication network can be used within the scope of the invention which can be used to "handle" the "layer 1" communication protocols (physical layer) to be used and "layer 2" communication protocols (data link layer), and in this case, in particular, the MAC protocol sublayer.

In an embodiment of the invention, a communication terminal device is provided. The communication terminal device may include a message generation circuit to generate an information inquiry message which specifies that another communication terminal device should transmit information about performance features of units in the physical layer or the data link layer of the other communication terminal device to that communication terminal device, and a transmitting circuit to transmit the information inquiry message. The communication terminal device may further include a receiving circuit to receive an information message with the information from the other communication terminal device and a selection circuit which uses the information to select units in the physical layer or the data link layer of the communication terminal device which should be used to set up a communication link to the other communication terminal device.

The communication terminal device may include a control circuit to control the selected units in the physical layer or the data link layer of the communication terminal device such that a communication link is set up to the other communication terminal device.

In an embodiment of the invention, the message generation circuit generates the information inquiry message when a predetermined event occurs, and the transmitting circuit transmits the information inquiry message that is generated, when the predetermined event occurs.

The predetermined event may be the communication terminal device being switched on, a communication link between the communication terminal and the other communication terminal device being terminated, a request from the user of the communication terminal device, a request from a program which is being run on the communication terminal device, or the reception of an instruction message which requests that the information inquiry message be produced and transmitted.

The transmitting device may be configured to transmit the information inquiry message to the other communication terminal device.

Furthermore, the transmitting device may be configured to transmit the information inquiry message to a third communication terminal device, with the request to the third communication terminal device to pass on the information inquiry message to the other communication terminal device.

In an embodiment of the invention, the communication terminal device and the other communication terminal device may be communication terminal devices for communication over a short distance.

The units in the physical layer or the data link layer may be configured to allow communication based on Bluetooth, IrDA or WLAN.

The units in the physical layer or the data link layer may be configured to allow communication using the ISM frequency band or the UWB frequency band.

In an embodiment of the invention, the communication terminal device may have a memory circuit to store the information, with the information being associated by means of identifications or addresses of the units in the physical layer or the data link layer with the units in the physical layer or the data link layer.

In another embodiment of the invention, a method for requesting communication terminal information which should be transmitted to a communication terminal is provided. The method may include generating an information inquiry message which specifies that another communication terminal device should transmit information about performance features of units in the physical layer or the data link layer of the other communication terminal device to that communication terminal device, and transmitting the information inquiry message.

In another embodiment of the invention, a communication terminal device is provided. The communication terminal device may include a message generation circuit to generate an instruction message for transmission to a second communication terminal device, which message specifies that the second communication terminal device should generate an information inquiry message which specifies that a third communication terminal device should transmit information about performance features of units in the physical layer or the data link layer of the third communication terminal device to the second communication terminal device, should transmit the information inquiry message, and after receiving the information, should pass the information on to the communication terminal device. Furthermore, the communication terminal device may include a transmitting circuit to transmit the instruction message.

In another embodiment of the invention, a method for requesting communication terminal device information which should be transmitted to a communication terminal device is provided. The method may include generating an instruction message for transmission to a second communication terminal device, which message specifies that the second communication terminal device should generate an information inquiry message which specifies that a third communication terminal device should transmit information about performance features of units in the physical layer or the data link layer of the third communication terminal device to the second communication terminal device, should transmit the information inquiry message, and after receiving the information, should pass the information on to the communication terminal device. The method may further include transmitting the instruction message.

In yet another embodiment of the invention, a communication terminal device is provided. The communication terminal device may include a receiving device to receive an information inquiry message from another communication terminal device, which message specifies that the communication terminal device should transmit information about performance features of units in the physical layer or the data link layer of that communication terminal device to the other communication terminal device, a message generation circuit to generate an information message with the information, and a transmitting circuit to transmit the information message.

In yet another embodiment of the invention, a method for generating communication terminal device information about features of a communication terminal device is provided. The method may include receiving an information inquiry message from another communication terminal device, which message specifies that the communication terminal device should transmit information about performance features of units in the physical layer or the data link layer of that communication terminal device to the other communication terminal device, a message generation circuit to generate an information message with the information, and a transmitting circuit to transmit the information message.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:
1. A communication terminal device, comprising:
   a message generation circuit configured to generate an information inquiry message which specifies that another communication terminal device should transmit information about performance features of units in the physical layer or the data link layer of the other communication terminal device to that communication terminal device;
   a transmitting circuit configured to transmit the information inquiry message;
   a receiving circuit configured to receive an information message with the information about performance features from the other communication device terminal; and
   a selection circuit configured to use the information about performance features to select units in the physical layer or the data link layer of the communication terminal which should be used to set up a communication link to the other communication terminal device.
2. The communication terminal device of claim 1, further comprising:
   a control circuit configured to control the selected units in the physical layer or the data link layer of the communication terminal device such that a communication link is set up to the other communication terminal device.
3. The communication terminal device of claim 1,
   wherein the message generation circuit generates the information inquiry message when a predetermined event occurs, and wherein the transmitting circuit transmits the information inquiry message that is generated, when the predetermined event occurs.
4. The communication terminal device of claim 3,
   wherein the predetermined event is the communication terminal device being switched on, a communication link between the communication terminal device and the other communication terminal device being terminated, a request from the user of the communication terminal device, a request from a program which is being run on the communication terminal device, or the reception of an instruction message which requests that the information inquiry message be generated and transmitted.
5. The communication terminal device of claim 1,
   wherein the transmitting circuit is further configured to transmit the information inquiry message to the other communication terminal device.
6. The communication terminal device of claim 1,
   wherein the transmitting circuit is further configured to transmit the information inquiry message to a third communication terminal device, with the request to the third communication terminal device to pass on the information inquiry message to the other communication terminal device.
7. The communication terminal device of claim 1,
   wherein the communication terminal device and the other communication terminal device are communication terminal devices for communication over a short distance.
8. The communication terminal device of claim 1,
   wherein the units in the physical layer or the data link layer allow communication based on Bluetooth, IrDA or WLAN.
9. The communication terminal device of claim 8,
   wherein the units in the physical layer or the data link layer allow communication using the ISM frequency band or the UWB frequency band.

10. The communication terminal device of claim 1, further comprising:
a memory device configured to store the information about performance features, with the information about performance features being associated by means of identifications or addresses of the units in the physical layer or the data link layer with the units in the physical layer or the data link layer.

11. A method for requesting communication terminal device information which should be transmitted to a communication terminal device, the method comprising:
generating an information inquiry message which specifies that another communication terminal device should transmit information about performance features of units in the physical layer or the data link layer of the other communication terminal device to that communication terminal device;
transmitting the information inquiry message;
receiving an information message with the information about performance features from the other communication device terminal; and
selecting units in the physical layer or the data link layer of the communication terminal which should be used to set up a communication link to the other communication terminal device using the received information about performance features.

12. The method of claim 11, further comprising:
controlling the selected units in the physical layer or the data link layer of the communication terminal device such that a communication link is set up to the other communication terminal device.

13. The method of claim 11,
wherein the information inquiry message is generated and transmitted when a predetermined event occurs.

14. The method of claim 11,
wherein the information inquiry message is transmitted to the other communication terminal device.

15. The method of claim 11,
wherein the information inquiry message is transmitted to a third communication terminal device, with the request to the third communication terminal device to pass on the information inquiry message to the other communication terminal device.

16. The method of claim 11,
wherein the communication terminal device and the other communication terminal device are communication terminal devices for communication over a short distance.

17. The method of claim 11,
wherein the units in the physical layer or the data link layer allow communication based on Bluetooth, IrDA or WLAN.

18. The method of claim 11, further comprising:
storing the information about performance features, with the information about performance features being associated by means of identifications or addresses of the units in the physical layer or the data link layer with the units in the physical layer or the data link layer.

19. A communication terminal device, comprising:
a message generation circuit configured to generate an instruction message for transmission to a second communication terminal device, which message specifies that the second communication terminal device:
should generate an information inquiry message which specifies that a third communication terminal device should transmit information about performance features of units in the physical layer or the data link layer of the third communication terminal device to the second communication terminal device;
should transmit the information inquiry message; and
after receiving the information about performance features, should pass the information about performance features on to the communication terminal device; and
a transmitting circuit configured to transmit the instruction message.

20. The communication terminal device of claim 19,
wherein the units in the physical layer or the data link layer allow communication based on Bluetooth, IrDA or WLAN.

21. The communication terminal device of claim 20,
wherein the units in the physical layer or the data link layer allow communication using the ISM frequency band or the UWB frequency band.

22. A method for requesting communication terminal information which should be transmitted to a communication terminal device, the method comprising:
generating an instruction message for transmission to a second communication terminal device, which message specifies that the second communication terminal device:
should generate an information inquiry message which specifies that a third communication terminal device should transmit information about performance features of units in the physical layer or the data link layer of the third communication terminal device to the second communication terminal device;
should transmit the information inquiry message; and
after receiving the information about performance features, should pass the information about performance features on to the communication terminal device; and
transmitting the instruction message.

23. The method of claim 22,
wherein the units in the physical layer or the data link layer allow communication based on Bluetooth, IrDA or WLAN.

24. The method of claim 23,
wherein the units in the physical layer or the data link layer allow communication using the ISM frequency band or the UWB frequency band.

25. A communication terminal device, comprising:
a message generation means for generating an information inquiry message which specifies that another communication terminal device should transmit information about performance features of units in the physical layer or the data link layer of the other communication terminal device to that communication terminal device;
a transmitting means for transmitting the information inquiry message;
a receiving means for receiving an information message with the information about performance features from the other communication device terminal; and
a selection means for selecting units in the physical layer or the data link layer of the communication terminal which should be used to set up a communication link to the other communication terminal device using the received information about performance features.

* * * * *